United States Patent
Rapp et al.

(10) Patent No.: US 11,780,296 B2
(45) Date of Patent: Oct. 10, 2023

(54) METHOD FOR OPERATING A COOLING SYSTEM OF A MOTOR VEHICLE WITH COOLING CAPACITY CONTROL

(71) Applicant: Dr. Ing. h.c. F. Porsche Aktiengesellschaft, Stuttgart (DE)

(72) Inventors: Tobias Rapp, Weissach (DE); Samuel Siegel, Ehningen (DE); Andreas Adam, Ludwigsburg (DE); Marcel Dannowski, Bietigheim-Bissingen (DE); Christian Brozicek, Heilbronn (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/713,305

(22) Filed: Apr. 5, 2022

(65) Prior Publication Data
US 2022/0363111 A1 Nov. 17, 2022

(30) Foreign Application Priority Data
May 12, 2021 (DE) ..................... 10 2021 112 472.7

(51) Int. Cl.
*B60H 1/32* (2006.01)
*B60H 1/00* (2006.01)

(52) U.S. Cl.
CPC ....... *B60H 1/3205* (2013.01); *B60H 1/00385* (2013.01); *B60H 1/3227* (2013.01); *B60H 2001/3255* (2013.01)

(58) Field of Classification Search
CPC .............. B60H 1/3205; B60H 1/00385; B60H 1/32281; B60H 1/00278; B60H 2001/3255; B60H 2001/3272; B60H 2001/00307
See application file for complete search history.

(56) References Cited

U.S. PATENT DOCUMENTS 10,953,727 B2 3/2021 Hötzel et al.
2012/0247716 A1 10/2012 Galtz et al.
(Continued)

FOREIGN PATENT DOCUMENTS

CN 109421479 A 3/2019
DE 102010038733 A1 2/2012
(Continued)

OTHER PUBLICATIONS

Chinese Office Action for Chinese Application No. 202210533162.6, dated Jul. 28, 2023 with partial English translation, 13 pages.

*Primary Examiner* — Marc E Norman
(74) *Attorney, Agent, or Firm* — RatnerPrestia

(57) ABSTRACT

A method for operating a cooling system of a motor vehicle for cooling at least one component, a cooling system of a motor vehicle for cooling at least one component, and a motor vehicle having such a cooling system. The cooling system has a coolant circuit and a refrigerant circuit. The coolant circuit serves for cooling the at least one component and the refrigerant circuit and the coolant circuit are coupled thermally to one another via a heat exchanger. The coolant circuit has a conveying device for conveying a coolant in the coolant circuit. A cooling power of the refrigerant circuit can be regulated. The regulation of the cooling power of the refrigerant circuit is realized in a manner dependent on a return temperature of the coolant and/or on a temporal development of the return temperature of the coolant.

13 Claims, 2 Drawing Sheets

(56) References Cited

U.S. PATENT DOCUMENTS

| | | | | |
|---|---|---|---|---|
| 2017/0088006 A1* | 3/2017 | Blatchley | ............... | B60H 1/323 |
| 2018/0215231 A1* | 8/2018 | Porras | ..................... | B60L 58/26 |
| 2020/0215871 A1* | 7/2020 | Tomita | ..................... | B60H 1/26 |
| 2020/0247213 A1 | 8/2020 | Schroeder et al. | | |
| 2020/0254845 A1 | 8/2020 | Miura et al. | | |
| 2020/0313255 A1* | 10/2020 | Wu | ........................ | B60H 1/323 |

FOREIGN PATENT DOCUMENTS

| | | |
|---|---|---|
| DE | 102014117950 A1 | 6/2016 |
| DE | 102017211134 A1 | 1/2019 |
| DE | 102018113687 A1 | 12/2019 |
| DE | 102019201427 A1 | 8/2020 |
| DE | 102019216698 A1 | 5/2021 |

\* cited by examiner

METHOD FOR OPERATING A COOLING SYSTEM OF A MOTOR VEHICLE WITH COOLING CAPACITY CONTROL

CROSS-REFERENCE TO RELATED APPLICATION

This application claims priority to German Patent Application No. 10 2021 112 472.7, filed May 12, 2021, the content of such application being incorporated by reference herein in its entirety.

FIELD OF THE INVENTION

The present invention relates to a method for operating a cooling system of a motor vehicle for cooling at least one component. The cooling system is in particular a cooling system of an electrically operated or partially electrically operated motor vehicle. The invention furthermore relates to a cooling system of a motor vehicle for cooling at least one component, and to a motor vehicle having such a cooling system.

BACKGROUND OF THE INVENTION

Cooling systems for motor vehicles are known in various embodiments from the prior art. Cooling systems of said type are used in particular in electrically or partially electrically operated vehicles, and thus in hybrid or electric vehicles. In said vehicles, cooling systems of said type serve in particular for cooling a traction battery and/or the power electronics.

For example, DE 10 2010 038 773 A1, which is incorporated by reference herein, has disclosed a battery cooling system for a hybrid or electric vehicle that has a chiller for transfer of heat between a refrigerant circuit and a coolant circuit, wherein the cooling system has a bypass, which is assigned to the chiller, such that, for a predefined volume flow, as a result of the reduced or controlled allocation thereof to the chiller or to the bypass, the in each case desired cooling power can be transferred in the chiller.

DE 10 2019 201 427 A1, DE 10 2014 117 950 A1 and DE 10 2017 211 134 A1, which are each incorporated by reference herein, likewise relate to cooling systems of said type.

SUMMARY OF THE INVENTION

A cooling system commonly has a refrigerant circuit, also referred to as primary circuit, and a coolant circuit, also referred to as secondary circuit. A suitable refrigerant is used as fluid in the refrigerant circuit. By way of a suitable cyclic process, it is possible to generate condensation energy and evaporation energy which the refrigerant, at a given high pressure or low pressure, releases or absorbs. Here, it is possible, especially by means of the evaporation energy, for heat to be extracted via a heat exchanger, commonly referred to as chiller, from a secondary fluid circulating in the secondary circuit, whereby a cooling action on the secondary fluid is achieved. The components to be cooled are then cooled by means of the secondary fluid in that, with an increase in temperature, the secondary fluid extracts heat from the components to be cooled.

In order to reliably operate the components to be cooled, these typically have to be operated in a specific temperature range. Generally, regulation of the cooling power of the refrigerant circuit is therefore realized in a manner dependent on the temperature of that/those component(s) to be cooled in each case which is/are cooled by way of the coolant circuit. A problem is however that the temperatures of the components to be cooled can vary in a highly dynamic manner, in particular if they are components of an electric drive system of a partially electrically or electrically operated vehicle. In particular the power electronics are here often subjected to highly dynamic changes in temperature, that is to say changes in temperature over short time scales. In the case of changes in temperature over short time scales of the components to be cooled, regulation of the cooling power of the refrigerant circuit in a manner dependent on the temperature of the component to be cooled is disadvantageous since this leads to a variation in cooling power which is likewise highly dynamic, this in turn leading to an increased energy requirement and moreover to greater loading of the components of the cooling system, in particular of the refrigerant circuit. For example, vibration of a compressor, vibration of an expansion valve and generally a build-up of vibration of the components of the refrigerant circuit can occur.

Described herein is a method for operating a cooling system that overcomes the aforementioned disadvantages. Also described herein is a cooling system which overcomes the aforementioned disadvantages and which, in particular, can be operated according to the method according to aspects of the invention. Also described herein is a motor vehicle having such a cooling system.

The method according to aspects of the invention serves for operating a cooling system of a motor vehicle. The cooling system serves for cooling at least one component, in particular an electrified component, for example a traction battery or power electronics. Preferably, the cooling system serves for cooling a multiplicity of components, in particular for cooling a multiplicity of electrified components. The cooling system has a coolant circuit and a refrigerant circuit, wherein the coolant circuit serves for cooling the at least one component. The refrigerant circuit and the coolant circuit are coupled thermally via a heat exchanger. The heat exchanger serves for extracting heat from the coolant in the coolant circuit and for feeding said heat to the refrigerant. The coolant circuit has a conveying device for conveying the coolant in the coolant circuit. The cooling power of the refrigerant circuit can be regulated, wherein the regulation of the cooling power of the refrigerant circuit is realized in a manner dependent on a return temperature of the coolant and/or on a temporal development of the return temperature of the coolant.

In this respect, the method according to aspects of the invention proposes to regulate the cooling power of the refrigerant circuit in a manner dependent on the temperature of the coolant, and/or on the temporal development of the temperature of the coolant, in the region of a return, and thus in a manner dependent on the temperature downstream of the component to be cooled and upstream of the heat exchanger. Since the coolant takes up a relatively large volume and, moreover, mixing of the coolant in the coolant circuit also takes place, and the coolant moreover has a high specific heat capacity, temperature peaks at the respective component to be cooled do not result in an abrupt increase in the temperature of the coolant in the region of the return, so that, by contrast to the temperatures of the components to be cooled, the temperature of the coolant varies relatively slowly, whereby, through the use of the temperature of the coolant in the region of the return, damping, as it were, is realized by the coolant. In particular abrupt changes in temperature at the component to be cooled then lead not to abrupt regulation of the cooling power of the refrigerant circuit but, owing to very much slower temperature development of the coolant, to a readjustment of the cooling power of the refrigerant circuit that is likewise relatively slow. In this way, the components of the refrigerant circuit are protected and moreover robust power regulation which is improved in terms of energy and which reduces overpressure shutoffs and underpressure shutoffs and which consequently prevents the failure of the cooling system is.

It is provided in particular that the regulation of the cooling power is realized in such a way that multiple temperature windows for the return temperature are defined and a cooling power to be provided by the refrigerant circuit is associated with the respective temperature window. The fact that the temperature window is relatively extensive, for example the respective temperature window covers a range of several 10 to several 100° C., means that continual or frequent readjustment of the cooling power of the refrigerant circuit is avoided.

It is provided in particular that the cooling power is increased if the return temperature exceeds a specific value and/or the temporal development of the return temperature exceeds a specific value, and/or the cooling power is reduced if the return temperature falls below a specific value and/or the temporal development of the return temperature falls below a specific value.

It is by all means conceivable that multiple specific values are provided, and in particular these specific values form the limits of the respective temperature window.

It is considered to be advantageous if the regulation of the cooling power of the refrigerant circuit is realized additionally in a manner dependent on a feed temperature of the coolant and/or on a temporal development of the feed temperature of the coolant. This embodiment has the advantage that an additional check of sufficient cooling power of the refrigerant circuit is provided, since, beside the return temperature, use is also made of the feed temperature for the regulation of the cooling power of the refrigerant circuit.

The cooling system according to aspects of the invention serves for cooling at least one component, preferably a multiplicity of components. The cooling system serves in particular for carrying out the method according to aspects of the invention, in particular the advantageous embodiments of the latter. The cooling system has a coolant circuit and a refrigerant circuit, wherein the coolant circuit serves for cooling the at least one component and the refrigerant circuit and the coolant circuit are coupled thermally to one another via a heat exchanger. The coolant circuit has a conveying device for conveying a coolant in the coolant circuit, wherein the cooling system has a temperature sensor for measuring a return temperature of the coolant in the region of the return. The cooling system furthermore has a regulating device for regulating the cooling power of the refrigerant circuit, wherein the regulating device is configured to regulate the cooling power of the cooling circuit in a manner dependent on the return temperature of the coolant and/or on a temporal development of the return temperature of the coolant.

With regard to the advantages of said cooling system, reference is made to the above statements concerning the method.

Preferably, the refrigerant circuit has a compressor, a condenser and an expansion valve.

It is considered to be particularly advantageous if the cooling system has a chiller, and in particular the chiller forms the heat exchanger or the heat exchanger is a constituent part of the chiller.

It is considered to be advantageous if the cooling system has a further temperature sensor for measuring a feed temperature of the coolant in the region of the feed.

The motor vehicle according to aspects of the invention has a cooling system according to aspects of the invention, in particular a cooling system according to one of the preferred embodiments. The vehicle is in particular an electrically or partially electrically operated motor vehicle, and thus a hybrid vehicle or an electric vehicle.

It is considered to be advantageous if the components to be cooled are an electrified component, for example a battery, power electronics, a semiconductor component, preferably an insulated gate bipolar transistor (IGBT for short), or a control unit.

In the case of the solution according to aspects of the invention, it is consequently provided that regulation of the cooling power of the refrigerant circuit is realized on the basis of the temperature of the coolant in the region of the return, in particular the temperature of the component to be cooled is not used for the regulation of the cooling power.

Consequently, through the measurement of the temperature of the coolant, damping of the temperature dynamics, as it were, is achieved, whereby the dynamics of the regulation or of the operation of the cooling system is likewise damped.

The invention furthermore has the advantage that it is not necessary for the temperature of the component to be cooled to be measured, whereby it is possible to dispense with temperature sensors at said component since regulation of the cooling power is realized on the basis of the return temperature of the coolant. The solution according to aspects of the invention especially has advantages in the case of the cooling of power electronics of an electric drive system, in particular in the case of the cooling of IGBTs, since these components have a particularly dynamic temperature development owing to their typically small thermal mass and typically the heat to be removed absolutely is ensured at a sufficiently low feed temperature.

BRIEF DESCRIPTION OF THE DRAWINGS

In the following figures, the invention will be discussed in more detail on the basis of an exemplary embodiment, without being limited to these. In the figures.

DETAILED DESCRIPTION OF THE INVENTION

Figure 1:
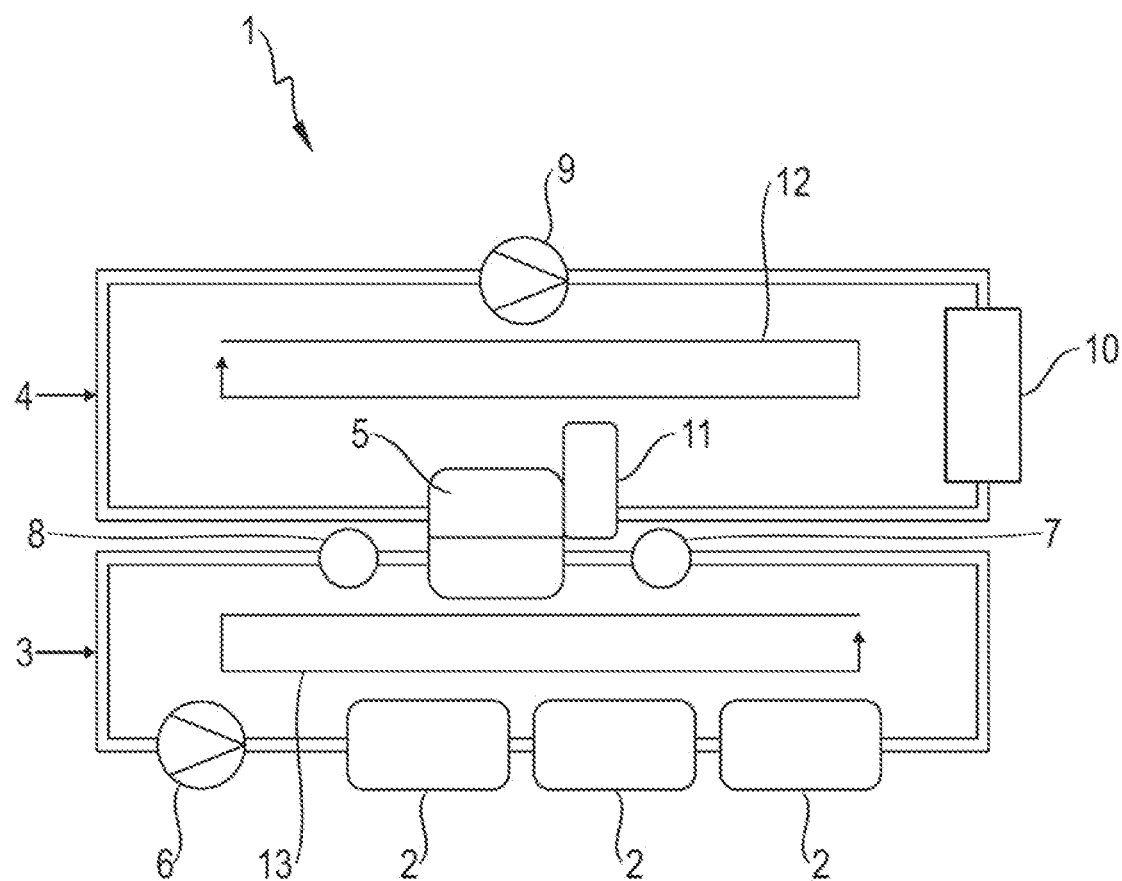
FIG. 1 shows an embodiment of a cooling system according to aspects of the invention in a schematic illustration.

FIG. 1 shows a cooling system 1 according to aspects of the invention, wherein said cooling system 1 has a coolant circuit 3 and a refrigerant circuit 4, wherein the coolant circuit 3 serves for cooling the three components 2. In the present case, the components 2 are electrified components, for example are power electronics or components of power electronics or are a high-voltage battery. The refrigerant circuit 4 and the coolant circuit 3 are coupled thermally to one another via a heat exchanger 5. The refrigerant circuit 4 has a compressor 9, a condenser 10 and an expansion valve 11. The refrigerant of the refrigerant circuit 3 circulates clockwise in the refrigerant circuit 4, as is indicated by the arrow 12. The coolant circuit 3 has a conveying device 6 for conveying a coolant in the coolant circuit 3, wherein the coolant circulates counterclockwise in the coolant circuit 3, as is indicated by the arrow 13. The cooling system 1 has a temperature sensor 7 for measuring a return temperature of the coolant in the region of the return, and thus before the entry of the coolant into the heat exchanger 5. The cooling system 1 furthermore has a further temperature sensor 8 for measuring a feed temperature of the coolant in the region of the feed. This temperature sensor 8 is accordingly arranged in the region after the exit of the coolant from the heat exchanger 5. During the operation of the cooling system 1, the feed temperature is lower than the return temperature.

The cooling system 1 has a regulating device (not illustrated in any more detail) for regulating the cooling power of the refrigerant circuit 4, wherein the regulating device is configured to regulate the cooling power of the refrigerant circuit 4 in a manner dependent on the return temperature of the coolant and/or on a temporal development of the return temperature of the coolant.

Regulation in a manner dependent on a temporal development of the return temperature of the coolant has the advantage that, in this way, an increase in the cooling power of the refrigerant circuit can be realized if rapid heating of the coolant in the coolant circuit is registered. Consequently, thermal escalations can be avoided or damped.

The regulation of the cooling power of the refrigerant circuit may be realized for example through an increase in the rotational speed of the compressor 9 and/or through a change of the settings of the expansion valve 11.

Figure 2:
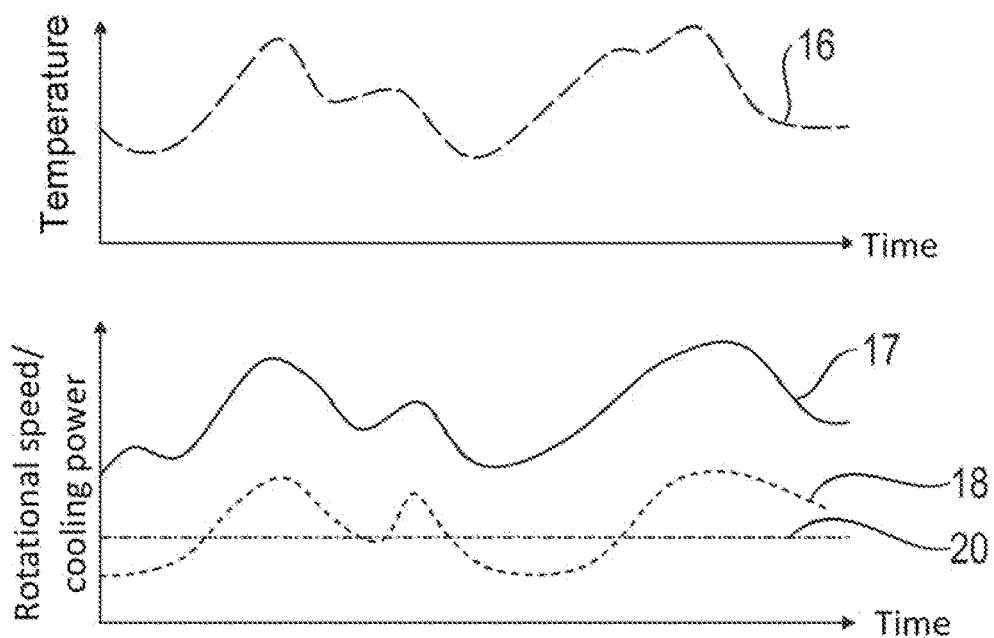
FIG. 2 shows two diagrams relating to regulation of a refrigerant circuit according to the prior art.
Figure 3:
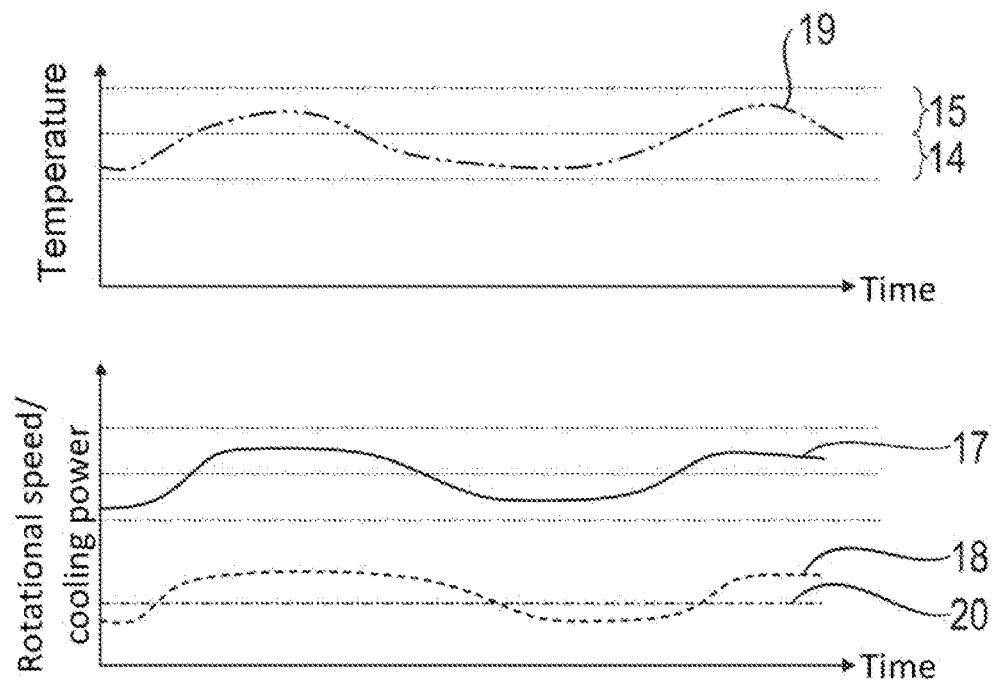
FIG. 3 shows two diagrams relating to regulation of the cooling power of a refrigerant circuit according to the present invention.

The advantages of the solution according to aspects of the invention become clear from a comparison of FIGS. 2 and 3. FIG. 2 shows a curve 16 in the upper diagram, wherein said curve 16 shows the temporal development of the temperature of a component to be cooled. The curve 18 shows a cooling power of the refrigerant circuit 4 where the regulation of the cooling power is realized in a manner dependent on the temperature of the component 2. The curve 17 in the lower diagram in FIG. 2 shows a rotational speed of the compressor 9 for attaining the corresponding cooling power. The dash-dotted line 20 shows a time-averaged cooling power of the refrigerant circuit 4.

As can be seen in the diagrams in FIG. 2, the temperature development of the component 2 is highly dynamic, that is to say relatively intense changes in temperature take place over relatively short time scales. Accordingly, the cooling power or the compressor rotational speed is correspondingly dynamically readjusted if the temperature of the component 2 is used for the regulation of the cooling power of the refrigerant circuit 4. On average, the result is a relatively high cooling power, which is associated with a correspondingly high energy consumption.

FIG. 3, by contrast, shows regulation as provided by the solution according to aspects of the invention. The curve 19 in the upper diagram in FIG. 3 then shows not the temperature of the component 2 to be cooled but the return temperature of the coolant in the coolant circuit 3. As shown by a comparison of the two upper diagrams in FIGS. 2 and 3 or of the curves 16 and 19, the temporal profile of the return temperature is smoother or more damped than the temporal development of the temperature of the component 2. The reason for this is that the coolant has a very much larger thermal mass compared to the component 2 and accordingly has a higher thermal inertia than the component 2. Although an increase in the temperature of the component 2 also leads to an increase in the temperature of the coolant at the return of the refrigerant circuit 3, the temporal development of the temperature is correspondingly damped owing to the relatively large thermal mass. According to aspects of the invention, it is then provided that the temperature of the coolant at the return is used for the regulation of the cooling power of the refrigerant circuit 4. Accordingly, it is also the case that the temporal development of the cooling power of the refrigerant circuit 4 or the compressor rotational speed is very much slower or more damped than in the case in FIG. 2 or in the methods known from the prior art. Likewise, the average cooling power is lower than in the case in the method according to the prior art.

In the upper diagram in FIG. 3, two temperature windows 14 and 15 are additionally drawn, wherein the first temperature window 14 covers relatively low temperatures and the temperature window 15 covers relatively high temperatures, wherein the two temperature windows 14, 15 are adjacent to one another. A cooling power to be provided by the refrigerant circuit 4 is associated with the respective temperature window 14, 15, wherein the cooling power is higher in the temperature window 15 than in the temperature window 14.

In the present case, the regulation of the cooling power is realized not solely on the basis of the absolute return temperature, and thus not solely on the basis of which temperature window 14, 15 the return temperature is in, but additionally in a manner dependent on the temporal development of the return temperature of the coolant. In the present case, an increase in the cooling power will already occur if the temporal development of the return temperature, and thus the change in temperature per unit time, exceeds a specific value. Furthermore, a reduction in the cooling power will already occur if the temporal development of the return temperature falls below a specific value. The regulation on the basis of the temporal development of the return temperature has the advantage that, in the case of the occurrence of a trend in the temperature development, for example a rapid rise in the temperature, an increase in the cooling power will, as a preventive measure, already occur before the return temperature exceeds a specific value, in order, in this way, to prevent an excessively large increase in the temperature.

LIST OF REFERENCE SIGNS

1 Cooling system
2 Component
3 Coolant circuit
4 Refrigerant circuit
5 Heat exchanger
6 Conveying device
7 Temperature sensor
8 Temperature sensor
9 Compressor
10 Condenser
11 Expansion valve
12 Arrow
13 Arrow
14 First temperature window
15 Second temperature window
16 Curve
17 Curve
18 Curve
19 Curve
20 Curve

What is claimed is:

1. A method for operating a cooling system of a motor vehicle for cooling at least one component, wherein the cooling system has a coolant circuit and a refrigerant circuit, wherein the coolant circuit serves for cooling the at least one component and the coolant circuit has a conveying device for conveying a coolant in the coolant circuit, and the refrigerant circuit and the coolant circuit are coupled thermally to one another via a heat exchanger, said method comprising:

regulating a cooling power of the refrigerant circuit in a manner that is dependent on a return temperature of the coolant and/or on a change of the return temperature of the coolant over time, wherein the return temperature of the coolant is measured at a location in the coolant circuit that is downstream of the at least one component and upstream of the heat exchanger, wherein multiple temperature ranges for the return temperature are defined, and regulation of the cooling power is carried out such that a level of the cooling power provided by the refrigerant circuit is at least partially dependent based on which temperature range of the multiple temperature ranges the return temperature of the coolant is associated.

2. The method as claimed in claim 1, further comprising (i) increasing the cooling power if the return temperature exceeds a specific value and/or the change of the return temperature over time exceeds a specific value, and/or (ii) reducing the cooling power if the return temperature falls below a specific value and/or the change of the return temperature over time falls below a specific value.

3. The method as claimed in claim 1, further comprising regulating the cooling power in a manner dependent on a feed temperature of the coolant and/or on a change of the feed temperature of the coolant over time.

4. The method as claimed in claim 1, further comprising regulating the cooling power of the refrigerant circuit in a manner that is dependent on the return temperature of the coolant and on the change of the return temperature of the coolant over time.

5. The method as claimed in claim 1, wherein each temperature range is delimited by an upper value and a lower value.

6. A cooling system of a motor vehicle for cooling at least one component, said cooling system comprising:

a coolant circuit for cooling the at least one component, wherein the coolant circuit comprises (i) a conveying device for conveying a coolant in the coolant circuit, and (ii) a temperature sensor for measuring a return temperature of the coolant, wherein the temperature sensor is positioned at a location in the coolant circuit that is downstream of the at least one component and upstream of the heat exchanger;

a refrigerant circuit coupled thermally to the coolant circuit via a heat exchanger; and wherein the cooling system further comprises (iii) a regulating device for regulating a cooling power of the refrigerant circuit, wherein the regulating device is configured to regulate the cooling power of the refrigerant circuit in a manner dependent on the return temperature of the coolant and/or on a change of the return temperature of the coolant over time, wherein multiple temperature ranges for the return temperature are defined, and regulation of the cooling power is carried out such that a level of the cooling power provided by the refrigerant circuit is at least partially dependent based on which temperature range of the multiple temperature ranges the return temperature of the coolant is associated.

7. The cooling system as claimed in claim 6, wherein the refrigerant circuit has a compressor, a condenser and an expansion valve.

8. The cooling system as claimed in claim 6, wherein the cooling system has a chiller that forms the heat exchanger or the heat exchanger is a constituent part of the chiller.

9. The cooling system as claimed in claim 6, wherein the cooling system comprises a further temperature sensor for measuring a feed temperature of the coolant, wherein the further temperature sensor is positioned at a location in the coolant circuit that is downstream of the heat exchanger.

10. An electric or partially-electric motor vehicle comprising the cooling system as claimed in claim 5.

11. The motor vehicle as claimed in claim 10, wherein the component to be cooled is a battery, power electronics, a semiconductor component, or an insulated gate bipolar transistor.

12. The motor vehicle as claimed in claim 6, wherein the cooling system is configured to regulate the cooling power of the refrigerant circuit in a manner that is dependent on the return temperature of the coolant and on the change of the return temperature of the coolant over time.

13. The motor vehicle as claimed in claim 6, wherein each temperature range is delimited by an upper value and a lower value.

* * * * *